(12) United States Patent
Chen et al.

(10) Patent No.: US 10,415,627 B1
(45) Date of Patent: Sep. 17, 2019

(54) SAFETY HOOK

(71) Applicant: AEROHOOK TECHNOLOGY CO., LTD., Taichung (TW)

(72) Inventors: Yang-Tsung Chen, Taichung (TW); Yi-Ching Lin, Taichung (TW); Kai-Chieh Yang, Taichung (TW)

(73) Assignee: AKILA TECH CO., LTD., Taoyuan (TW)

( * ) Notice: Subject to any disclaimer, the term of this patent is extended or adjusted under 35 U.S.C. 154(b) by 0 days.

(21) Appl. No.: 15/963,989

(22) Filed: Apr. 26, 2018

(51) Int. Cl.
*F16B 45/02* (2006.01)
*F16B 1/02* (2006.01)

(52) U.S. Cl.
CPC .............. *F16B 45/02* (2013.01); *F16B 1/02* (2013.01)

(58) Field of Classification Search
CPC .................................. F16B 45/02; F16B 1/02
See application file for complete search history.

(56) References Cited

U.S. PATENT DOCUMENTS

| | | | | |
|---|---|---|---|---|
| 7,437,806 B2* | 10/2008 | Lin | ............ | F16B 45/02 24/599.5 |
| 8,128,141 B2* | 3/2012 | Chen | ............ | F16B 45/02 24/599.5 |
| 2009/0049663 A1* | 2/2009 | Hong | ............ | B66C 1/36 24/600.1 |
| 2012/0042487 A1* | 2/2012 | Yang | ............ | F16B 45/02 24/599.5 |

* cited by examiner

*Primary Examiner* — Abigail E Troy
(74) *Attorney, Agent, or Firm* — Leong C. Lei

(57) ABSTRACT

The present invention mainly aims to rebuilt the structures of a hook body, valve and control handle and the link relationship thereof. The outer surface of two shrouds of the control handle are respectively stamped with a depression adapted project a similar limit block out of the inner surface of each shroud, the limit block having upper, lower blocking surfaces opposite to each other vertically, and the upper, lower blocking surfaces are further controlled to be perpendicular to the shroud, thereby allowing them to transfer stably the stress between the hook body and valve when withstanding the stress due to the inadvertent opening of the valve so that the valve and limit blocks are not deformed easily, have a longer use and enhance the overall use safety greatly.

18 Claims, 8 Drawing Sheets

SAFETY HOOK

(a) TECHNICAL FIELD OF THE INVENTION

The present invention relates to a safety hook, being better in structure and long in use life, and conforming to economic manufacturing requirements.

(b) DESCRIPTION OF THE PRIOR ART

The prior art is as shown in U.S. Pat. No. 7,437,806 "Safety hook", the U-shaped plate 31 seals the limiting arm unit 41 through the cylindrical limiting rod 32 so as to prevent the hook mouth 20 from being inadvertently opened. But, when the limiting arm unit 41 withstands the stress of an inadvertent touch, the stability degree that it withstands the stress is relatively reduced due to the small touch area, causing the limiting arm unit 41 to be easily deformed due to stress concentration; the deformation will affect the control smoothness of the limiting arm unit 41 or U-shaped plate 41 if light, and the limiting arm unit 41 or U-shaped plate 41 will be stuck if the deformation is heavy, causing the safety hook not to be used any more.

Referring to FIGS. 1 and 2, showing the main structures of US 20120042487 "double locking snap hook device background of the invention", the control handle 90 is a frame having an inverted U-shaped section and provided with a end plate 91 and two shrouds 92, where the outside of the end plate 91 is stamped with a depression 93 adapted to protrude out with a limit block 94 inside the end plate 91, and the limit block 94 is used to withstand the stress due to inadvertent touch. But, the corner parts S of the end plate in connection with the limit block 94 exist both the internal stress generated when the depression 93 is stamped and the internal stress when the end plate 91 is bended, which will affect the structural properties of the limit block 94 greatly, causing the corner parts S to be probably torn or deformed when limit block 94 is withstanding the stress.

SUMMARY OF THE INVENTION

The present invention mainly aims to rebuilt the structures of a hook body, valve and control handle and the link relationship thereof. The outer surface of two shrouds of the control handle are respectively stamped with a depression adapted to project a similar limit block out of the inner surface of each shroud, the limit block having upper, lower blocking surfaces opposite to each other vertically, and the upper, lower blocking surfaces are further controlled to be perpendicular to the shroud, thereby allowing them to transfer stably the stress between the hook body and valve when withstanding the stress due to the inadvertent opening of the valve so that the valve and limit blocks are not deformed easily and have a longer use. In addition, the present invention can further overcome the easy damage of the corners happening in US 20120042487 to enhance the overall use safety greatly.

DETAILED DESCRIPTION OF THE PREFERRED EMBODIMENTS

Figure 1:
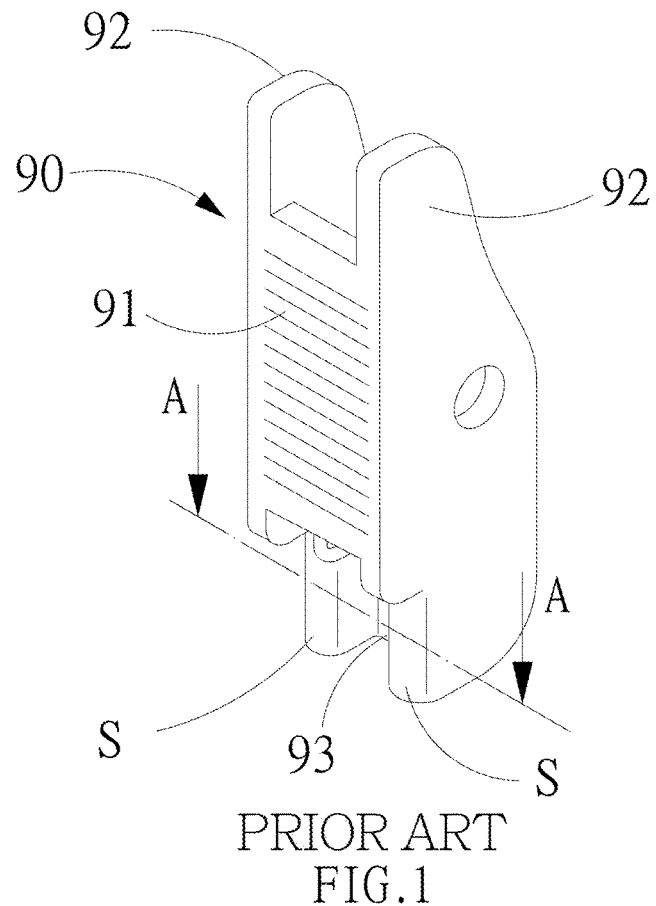
FIGS. 1 and 2 show the control handle structure of US 20120042487.
Figure 2:
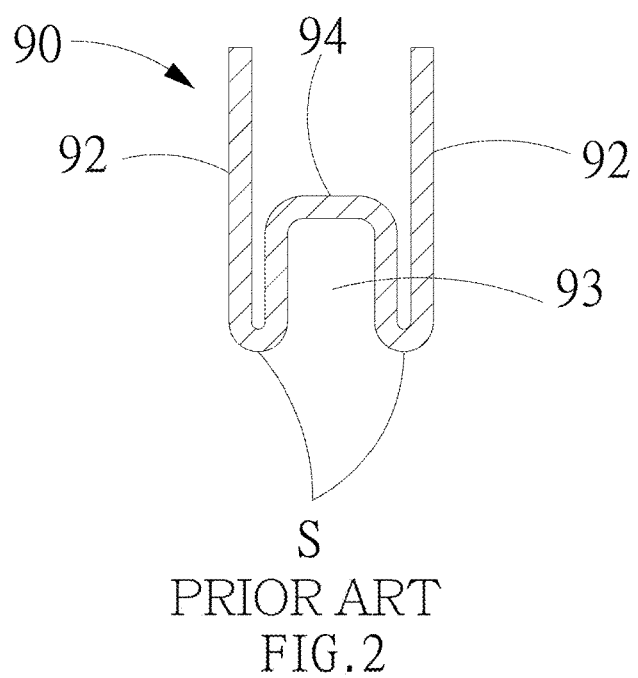

Referring to FIGS. 3 to 10, a safety hook of the present invention at least includes a hook body, valve 20 and control handle 30.

The hook body 10 has a hook hole 11 passed through the front and back surfaces, one side of which is configured with a hook opening 110 in communication with the hook hole 11, the upper side of the hook opening 11 is defined as a hook mouth 12, a position of the hook mouth 12 adjacent to the hook hole 11 is configured with a buckle block 121, the front, back surfaces of the hook body 10 are further respectively symmetrically protruded out with a shaft seat 13 at the lower side of the hook opening 110, a through hole 14 is passed through in the range of the shaft seat 13, another side of the hook body is indented with a first space 15 passed through the front and back sides and a second space 16 is positioned above the first space, the bottom of the first space 15 is defined as an activating surface 17, the outer edge of the activating surface 17 is configured with an engagement block 171 symmetrically protruded out of the front and back surfaces of the hook body 10, the activating surface 17 and engagement block 171, viewed from above, are allowed to be approximately formed into a T-shaped body, a second hole 18 passed through the front and back surfaces is configured on the junction of the first, second spaces 15, 16 of the hook body 10, and the bottom edge of the hook body 10 is further configured with a hanging hole 19 passed through the front and back sides.

The valve 20 is a hollow frame having an approximately inverted U-shaped section, and provided with a main plate 21 stretched across the hook opening 21 and two shield plates 22 symmetrically covered on the two ends of the first hole 14, the main plate 21 is configured with a buckle hole 211 capable of in engagement with the buckle block 121, the width of the groove formed by the two shield plates 22 is relatively larger than the thickness formed by the front, back surfaces of the hook body 10, the two shield plates are respectively passed through with a third hole 23 matching with the first hole 14, a first shaft 24 is adapted to couple the first hole 14 and third holes 23 together, allowing the valve 20 to be swung around the first shaft 24 to operate the engagement and disengagement of the buckle hole 211 with the buckle block 121, thereby opening or closing the hook opening 110; the shaft seat 13 is put around with a spring 25, one end of which is abutted against the hook body 10, and another end of which provides the valve 20 with prepressure, allowing the buckle hole 211 to have a tendency to be in engagement with the buckle block 121 any time, thereby constituting a first stage positioning structure adapted to keep closing the hook hole 11; the two shield plates 22 are respectively extended with a blocking plate 26 along the front, back surfaces of the hook body 10, the bottom of the blocking plate 26 is allowed to be exactly positioned above the engagement block 171, the junction of the shield plate 22 and blocking plate 26 is configured with a folding edge 27, which can further control a groove formed by the two blocking plates 26 being narrower than the two shield plates 22, allowing the groove width to be approximately equal to the thickness of the hook body 10, thereby enabling the two blocking plates 27 to be fit perfectly the front, back surfaces of the hook body 10 to carry out limit slip so as to facilitate the valve 20 to have better handling of precision operation when opening or closing the hook opening 110 besides strengthening the structural properties of the shield plates 22 and blocking plates 26.

The control handle 30 is an approximately inverted U-shaped frame having an end plate 31 stretched across the openings of the first space 15 and second space 16 and two shrouds 32 symmetrically covered on the two ends of the second hole 18, allowing the groove formed by the two shroud to be exactly covered on the engagement block 171 and the two blocking plates 26 therein, the two shrouds 32 are respectively configured with a fourth hole 33 matching with the second hole 18 on the approximately middle section so as to allow a second shaft 34 to be passed through the second hole 17 and fourth holes 33, allowing the control handle 30 to be able to be swung about the second shaft 34. Referring to FIGS. 3, 4, 5, 7 and 8, the outer surfaces of the two shrouds 32 are respectively stamped with an opposite trapezoidal depression 350 at the position of the first space 15, the both are the same and opposite to each other adapted to protrude from the inner surface of the shroud 32 with a limit block 35 with a corresponding shape, which forms a upper blocking surface 351 and lower blocking surface 352 vertically opposite to each other. More importantly, the upper blocking surface 351 and the lower blocking surface 352 are cut through the stamping die, allowing the junction of the top end of the depression 350 and the upper blocking surface 351 to be formed with a upper cut 353, and the junction of the bottom end of the depression 350 and the lower blocking surface 352 a lower cut 354, where the upper cut 353 and lower cut 354 are in a longitudinal direction and in symmetrical communication with the inside and outside of the depression 350, which is used to eliminate the arc angles generated naturally during stamping formation because the face to face junction of the limit block 35 and shroud 32 will certainly be formed an arc angle during the stretching of a sheet metal into the limit block 35 using a stamping die, and similarly, the corner of each surface of the limit block 35 in connection with the shroud 32 will certainly be generated with an arc angle. The present invention uses the upper cut 353 and lower cut 354 to eliminate the arc angles and further to control the upper blocking surface 351 and lower blocking surface 352 to be perpendicular to the shroud 32, allowing the upper blocking surface 351 and lower blocking surface 352 rather not to generate horizontal force upon stress transfer so as to maintain the structural properties of the blocking plate 26 and limit block 35. Specifically, if the corners of the two upper blocking surfaces 351 in connection with the shrouds 32 have arc angles, the bottom ends of the two blocking plates 26 are very easy to be guided to deform oppositely in the process of withstanding stresses, causing the two blocking plates 27 to interfere with the front and back surfaces of the hook body 10. Therefore, the present invention defining both the upper blocking surface 351 and lower blocking surface 352 to be perpendicular to the shrouds 32 indeed is a necessary core technology. As for the achievement of the above core technology by means of the configuration of the upper cut 353 and lower cut 354, it is a choice more conforming to economic manufacturing currently. The second shaft 34 is put around between the two shrouds 32 with a second spring 36, one end of which is abutted against the hook body 10, and another end of which pushes an end plate 31 of the control handle 30, thereby moving the upper blocking surface 351 of the limit block 35 in succession to keep it under the blocking plate 26, and the lower blocking 352 thereof to keep it under activating surface 17 and engagement block 171, thereby constituting a second stage positioning structure, making sure that the valve 20 closes the hook opening 110, and limiting the control handle 30 to only take the second shaft 34 as a center to swing toward the second space 16. The top edges of the two shrouds 32 are formed into a necking area 37 having a thickness approximately equal to the one of the hook body 10, thereby allowing the necking area 37 to be slipped limitedly in a way of fitting the front and back sides of the hook body 10 perfectly, and not to be interfered upon entering and leaving the space between the two shield plates 22. In addition, to strengthen the stress withstanding structural properties of the two shrouds 32, each shroud 32 above the limit block 35 is passed through a fifth hole 381 adapted to bridge a reinforcement bolt 38, which is relatively positioned outside of the bottom end of the blocking plate 27.

Figure 3:
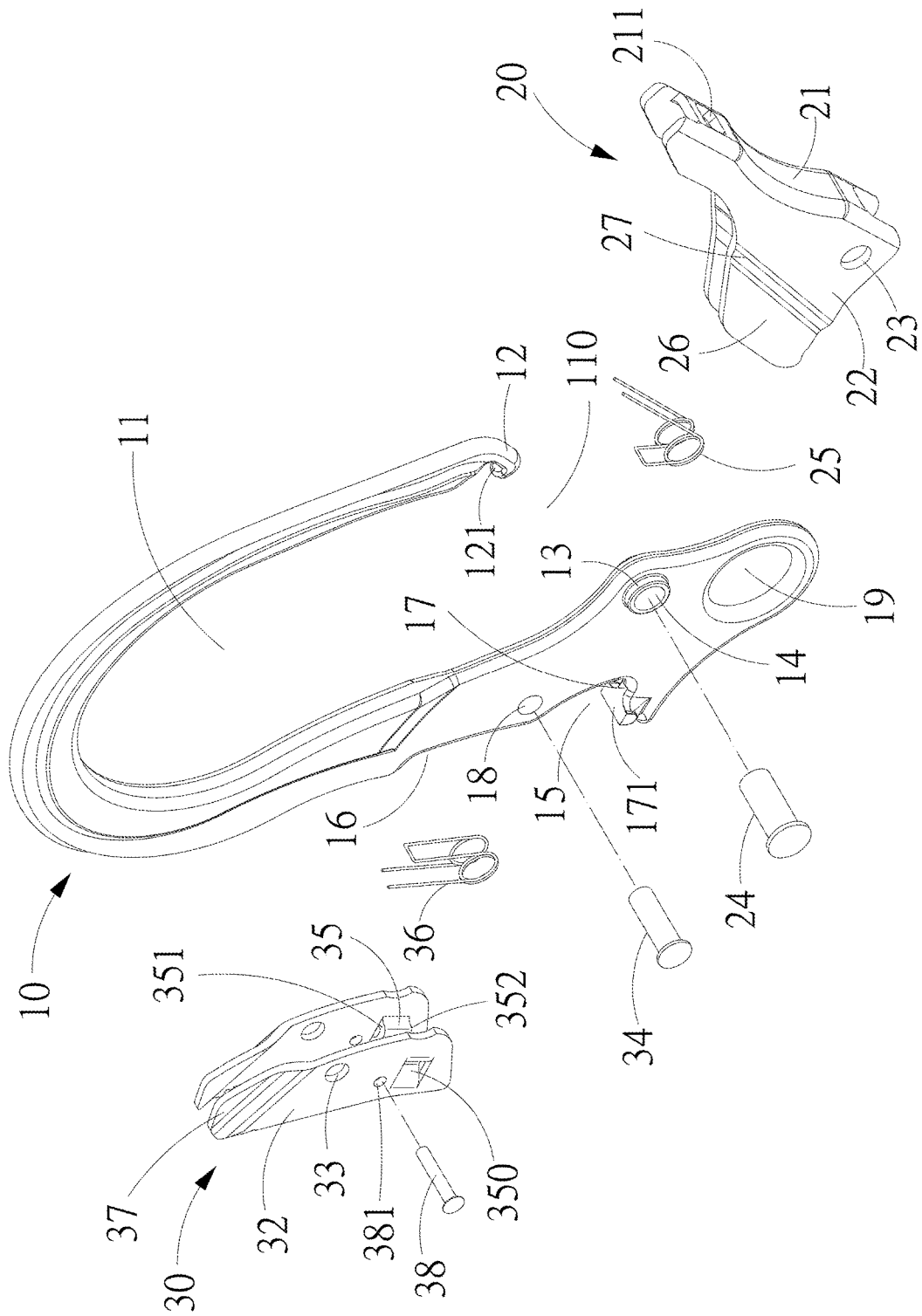
FIG. 3 is an exploded view of the present invention.
Figure 4:
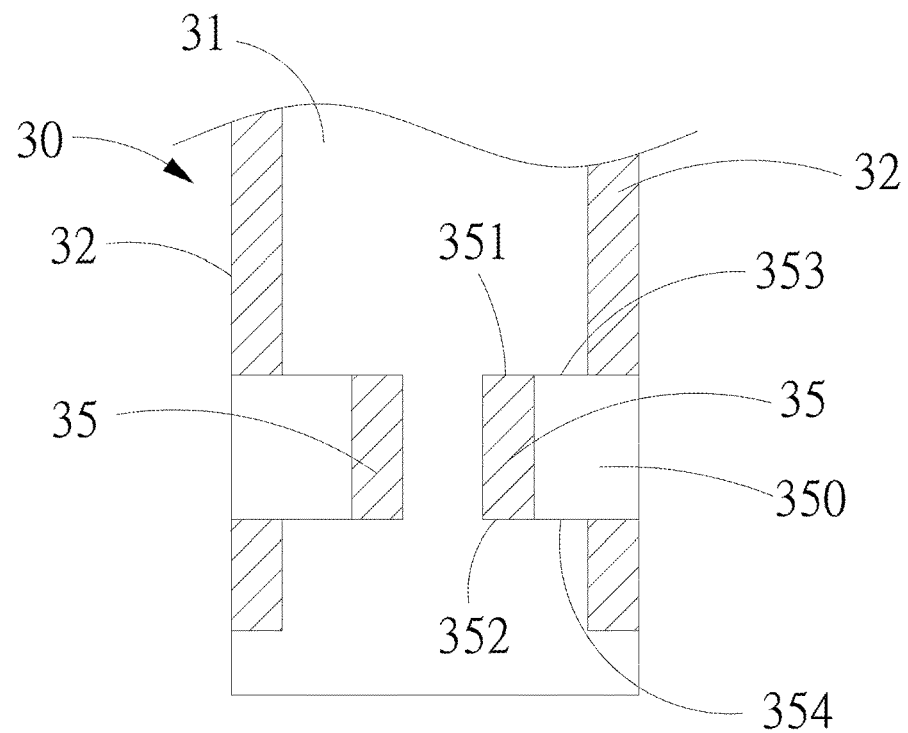
FIG. 4 is a partly longitudinal cross-sectional view of a control handle of the present invention.
Figure 5:
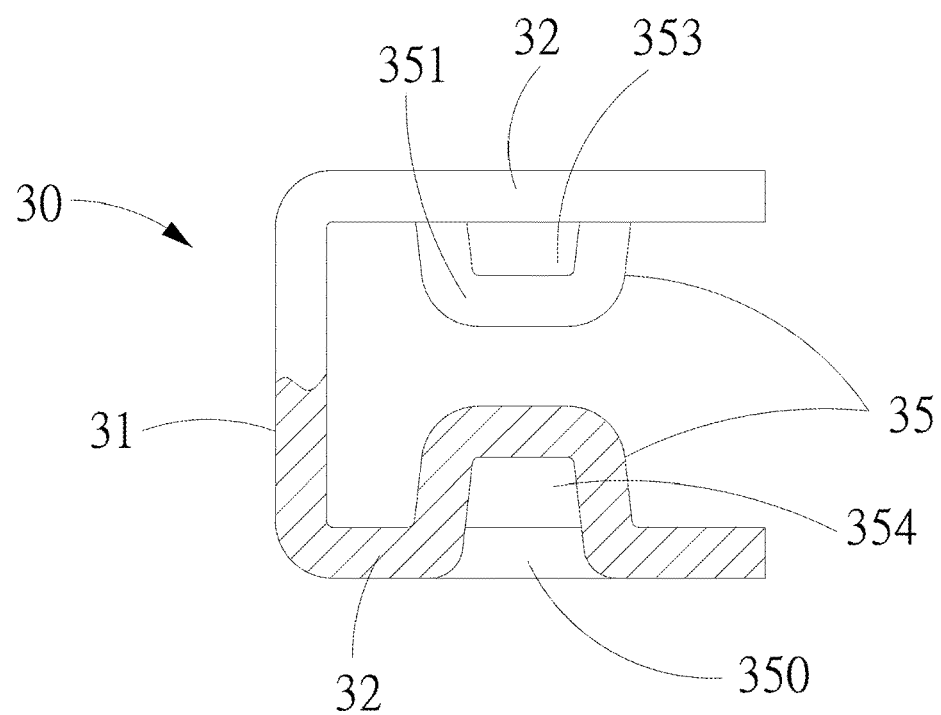
FIG. 5 is a transverse vertical cross-sectional view of the control handle of the present invention.
Figure 6:
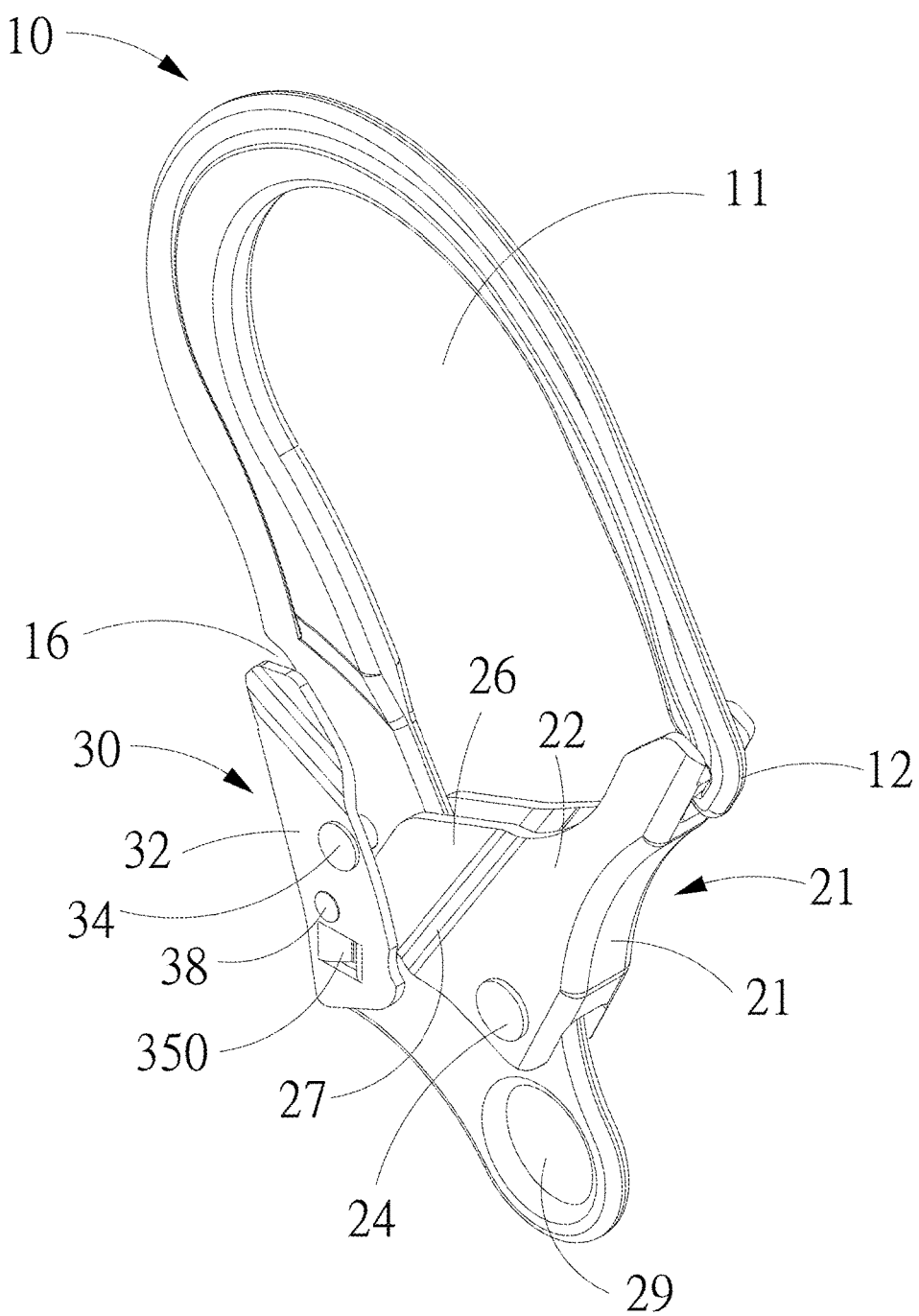
FIG. 6 is a perspective view of the present invention.
Figure 7:
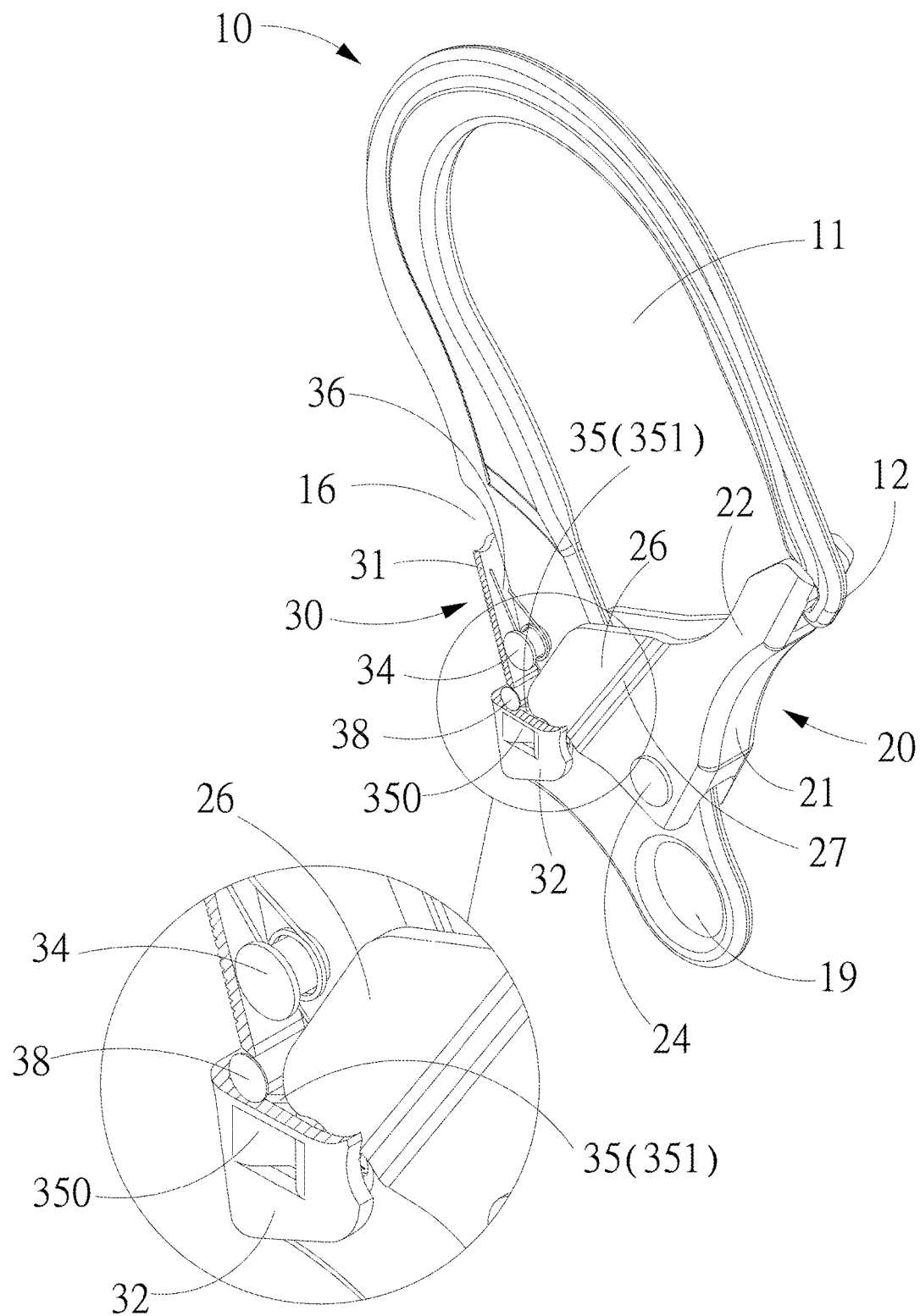
FIG. 7 is a partly cross-sectional view of FIG. 5.
Figure 8:
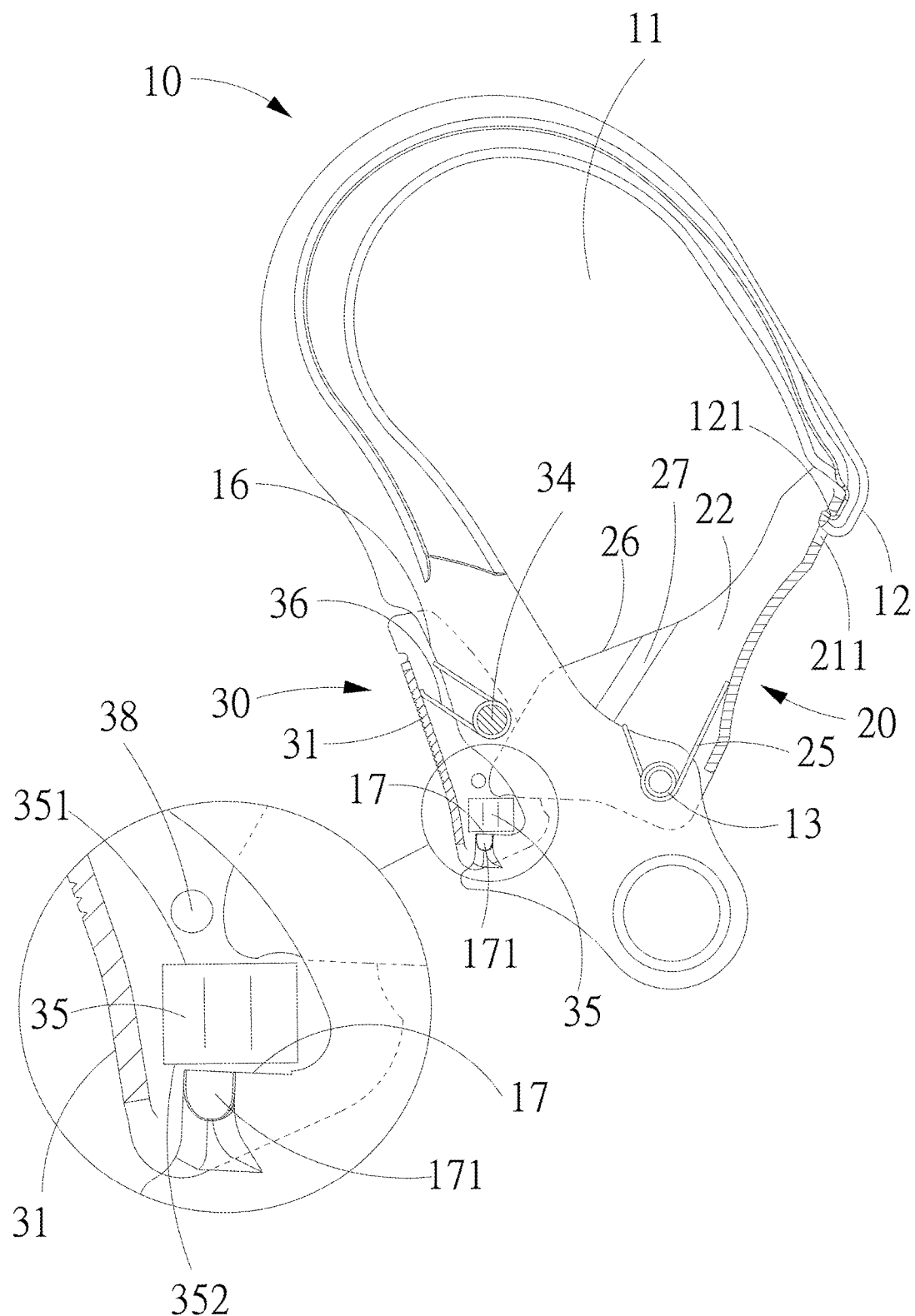
FIG. 8 is a front cross-sectional view of the present invention when a valve is closed.
Figure 9:
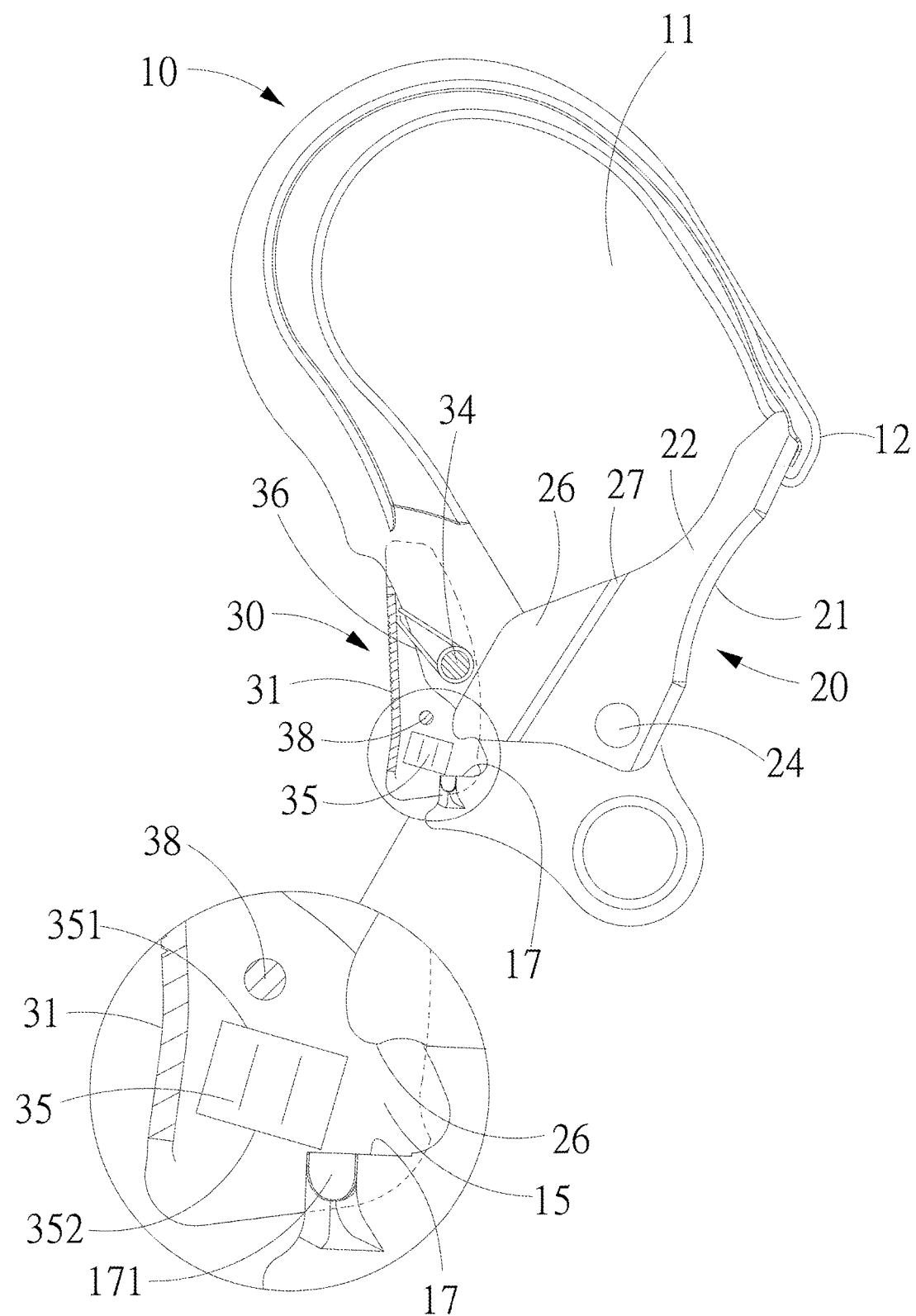
FIG. 9 shows the relative positions of the components of the present invention when limit blocks are released.
Figure 10:
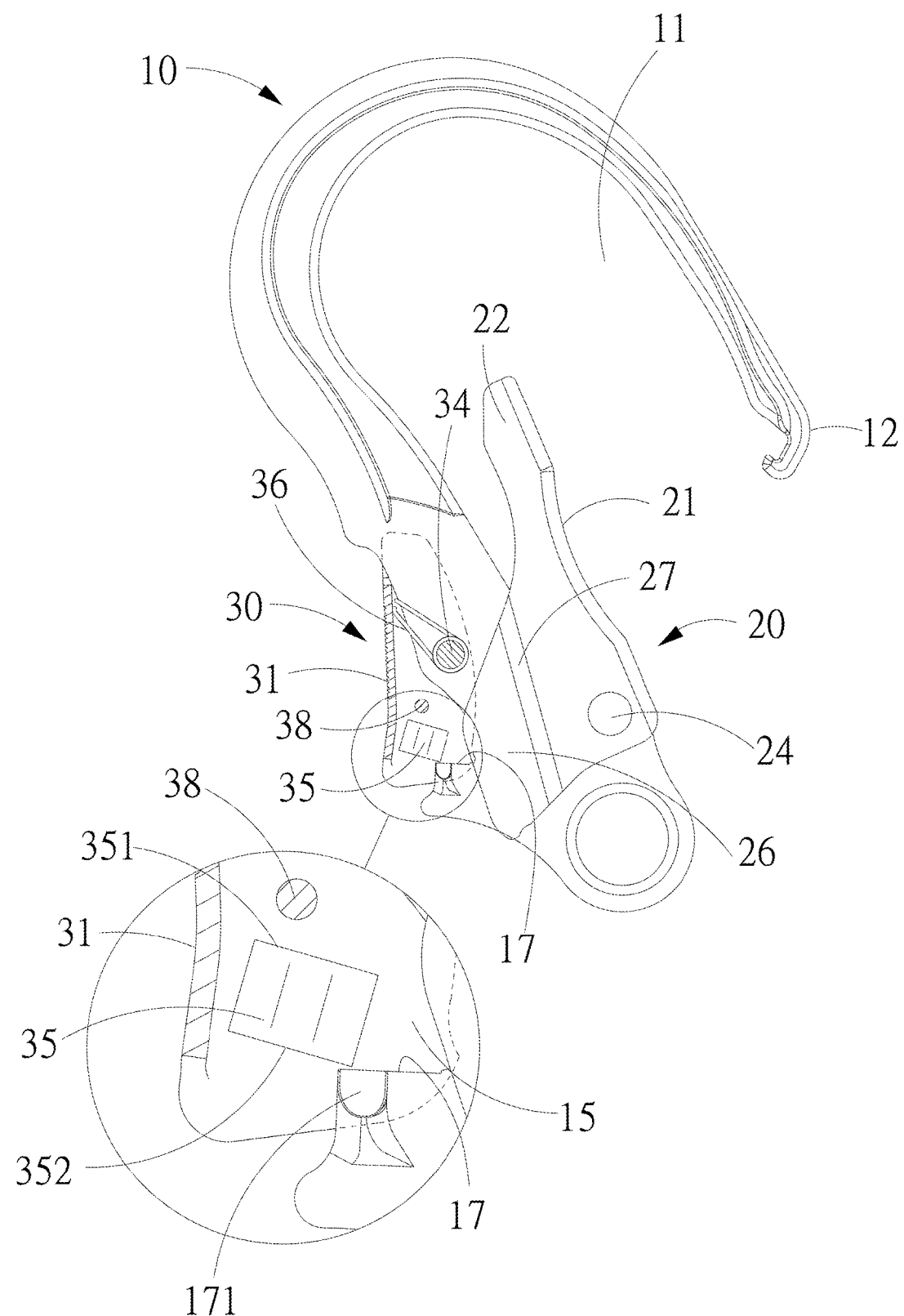
FIG. 10 shows the relative positions of the components of the present invention when the valve is opened.

Referring to FIGS. 3, 9 and 10, the top edge of the control handle 30 must first be pressed to move into the second space 16 when the hook opening 110 wants to be opened, allowing the limit blocks 35 on the bottom edge of the control handle 30 to be swung toward the opening of the first space 15 without any interference, enabling the limit blocks 35 to be released from the position between the bottom end of the blocking plate 27 and the engagement block 171, thereby releasing the locking state of the valve 20. Subsequently, the valve 29 can then be operated to swing toward the hook hole 11 to open the hook opening 110, allowing the unloading or loading to be carried out.

From the description mentioned above, the present invention at least has the following characteristics:

1. The present invention allows the upper cut 353 to eliminate the arc angle of bending forming generated at the junction of the upper blocking surface 351 and the shroud 32, and the lower cut 354 to eliminate the arc angle of bending forming generated at the junction of the lower blocking surface 352 and the shroud 32 by means of stamping die design, and further control the upper blocking surface 351, lower blocking surface 352 to be perpendicular to the shrouds 32 effectively, enabling the upper blocking surface 351, lower blocking surface 352 to transmit the stress between the hook body 10 and valve vertically when withstanding the stress generated by inadvertent opening of the valve 20, allowing the two blocking plates 26 of the valve 20 rather not to be deformed horizontally. Similarly, the upper blocking surface 351, lower blocking surface 352 are also not easy to be deformed.

2. Each shroud 32 of the control handle 30 is stamped with the limit block 35, the upper blocking surface 351 and lower blocking surface 352 of which are adapted to transfer stress planarly from the hook body 10 to valve 20 when withstanding the stress generated due to the inadvertent opening of the valve 20 so that the area of thrust surface of the valve 20 is far greater than the one shown in U.S. Pat. No. 7,437,806. Therefore, the present invention can scatter the stress of the valve 20 effectively and cannot be deformed easily. In addition, the total area of thrust surface of the two limit blocks 35 of the present invention is also greater than the one described in US 20120042487 so as to allow the valve 20 and limit blocks 35 to similarly have a longer use.

3. The two shrouds 32 of the present invention each configured with a limit block 35 may certainly effectively decrease the inner stress of the corner of the end plate 31, thereby overcoming the security risks found in US 20120042487 and enhancing overall use safety greatly.

We claim:

1. A safety hook, comprising:
   a hook body, having a hook hole passed through front and back surfaces thereof, one side of said hook body configured with a hook opening in communication with said hook hole, another side thereof indented with a first space, and a bottom end of said first space defined as an activating surface;
   a valve, one end thereof coupled pivotally below said hook opening with a first shaft, and having a first spring to push said valve to close said hook opening, said valve further respectively extended with a blocking plate along the front and back surfaces of said hook body; and
   a control handle, two shrouds thereof each covering said blocking plate and coupled pivotally to said hook body with a second shaft, said two shrouds each stamped with a depression for projecting a limit block out of the inner surfaces of said two shrouds, said limit block having an upper blocking surface and lower blocking surface opposite to each other vertically, said upper and lower blocking surfaces being perpendicular to said shrouds, said control handle being pushed by a second spring, thereby moving said upper blocking surface therewith to keep said upper blocking surface below said blocking plate, and keeping said lower blocking surface to be above said activating surface so as to ensure that said valve closes said hook opening; said limit block being released from a position between said blocking plate and an engagement block when said control handle is operated to swing with respect to said second shaft so as to unlock said valve.

2. The safety hook according to claim 1, wherein a junction of a top end of said depression and said upper blocking surface is configured with an upper cut, a junction of a bottom end of said depression and said lower blocking surface is configured with a lower cut, said upper and lower cuts longitudinally communicate on an inner side of said depression with an outer side thereof, adapted to eliminate are angles generated in stamping, thereby making said upper and lower blocking surfaces to be perpendicular to said shrouds.

3. The safety hook according to claim 2, wherein said two shrouds are passed through with a fifth hole for bridging a reinforcement bolt, bottom ends of said two blocking plates are kept above said activating surface.

4. The safety hook according to claim 2, wherein an outer edge of said activating surface has engagement blocks symmetrically protruded out said front and back surfaces of said hook body, allowing a groove formed by said two shrouds to exactly cover said engagement blocks of said activating surface therein, thus making said lower blocking surface of said limit block to be kept above said activating surface and said engagement of said activating surface, thereby ensuring that said valve closes said hook opening.

5. The safety hook according to claim 2, wherein an upper side of said hook opening of said hook body is defined with a hook mouth, a portion of said hook mouth adjacent to said hook hole is configured with a buckle block, a lower side of said hook opening of said hook body is further passed through with a first hole; said valve has a main plate stretched across said hook opening and symmetrically covering said two shrouds of two ends of said first hole; said main plate is configured with buckle hole to engage with said buckle block, a groove width formed by two shield plates is relatively larger than a thickness formed by said front and back surfaces of said hook body, said two two shield plates are passed through with a third hole matching with said first hole, said first shaft is coupled to said first hole and said third hole, thus allowing said valve to swing with respect to said first shaft to operate engagement and disengagement of said buckle hole and buckle block, thereby opening or closing said hook opening.

6. The safety hook according to claim 5, wherein said lower side of said hook opening of said front and back surfaces of said hook body is symmetrically protruded with a shaft seat, said first hole is passed through said shaft seat; said shaft seat is put around with said first spring, one end of said first spring is abutted against said hook body, another end thereof provides said valve with pre-pressure, allowing said buckle hole to have a tendency to be in engagement with said buckle block any time, thereby constituting a first stage positioning structure to close said hook opening.

7. The safety hook according to claim 5, wherein each said shield plate is extended with said blocking plate along said front and back surfaces of said hook body, a junction of said shield plate and blocking plate is configured with a folding edge, thereby making said groove width formed by said two blocking plates to be smaller than a groove width formed by said two shield plates, allowing said two blocking plates to fit said front and back surfaces to carry out limit slip.

8. The safety hook according to claim 5, wherein top edges of said two shrouds are formed with a necking area, allowed to be fit to said front and back surfaces of said hook body to process limit slip, and enter and leave a groove formed by said two shield plates.

9. The safety hook according to claim 2, wherein said another side of said hook body is configured with a second space above said first space, and said hook body is configured with a second hole at a junction of said first space and said second space; said control handle has an end plate stretched across an opening of said first space and said second space and said two shrouds symmetrically covering two ends of said second hole, a middle position of each said shroud is configured with a fourth hole matching with said second hole, thereby allowing said second shaft to be passed through said second hole and said fourth holes.

10. The safety hook according to claim 9, wherein said second shaft is put into said second spring between said two shrouds, one end of said second spring is abutted against said hook body, another end thereof pushes said end plate of said control handle and limits said control handle only to swing with respect to said second shaft toward said second space, thereby unlocking said valve.

11. The safety hook according to claim 1, wherein said two shrouds are passed through with a fifth hole for bridging a reinforcement bolt, bottom ends of said two blocking plates are kept above said activating surface.

12. The safety hook according to claim 1, wherein an outer edge of said activating surface has engagement blocks symmetrically protruded out said front and back surfaces of said hook body, allowing a groove formed by said two shrouds to exactly cover said engagement blocks of said activating surface therein, thus making said lower blocking surface of said limit block to be kept above said activating surface and said engagement blocks of said activating surface, thereby ensuring that said valve closes said hook opening.

13. The safety hook according to claim 1, wherein an upper side of said hook opening of said hook body is defined with a hook mouth, a portion of said hook mouth adjacent to said hook hole is configured with a buckle block, a lower side of said hook opening of said hook body is further passed through with a first hole; said valve has a main plate stretched across said hook opening and symmetrically covering said two shrouds of two ends of said first hole; said main plate is configured with buckle hole to engage with said buckle block, a groove width formed by two shield plates is relatively larger than a thickness formed by said front and back surfaces of said hook body, said two shield plates are passed through with a third hole matching with said first hole, said first shaft is coupled to said first hole and said third hole, thus allowing said valve to swing with respect to said first shaft to operate engagement and disengagement of said buckle hole and buckle block, thereby opening or closing said hook opening.

14. The safety hook according to claim 13, wherein said lower side of said hook opening of said front and back surfaces of said hook body is symmetrically protruded with a shaft seat, said first hole is passed through said shaft seat; said shaft seat is put around with said first spring, one end of said first spring is abutted against said hook body, another end thereof provides said valve with pre-pressure, allowing said buckle hole to have a tendency to be in engagement with said buckle block any time, thereby constituting a first stage positioning structure to close said hook opening.

15. The safety hook according to claim 13, wherein each said shield plate is extended with said blocking plate along said front and back surfaces of said hook body, a junction of said shield plate and blocking plate is configured with a folding edge, thereby making a groove width formed by said two blocking plates to be smaller than said groove width formed by said two shield plates, allowing said two blocking plates to fit said front and back surfaces to carry out limit slip.

16. The safety hook according to claim 13, wherein top edges of said two shrouds are formed with a necking area, allowed to be fit to said front and back surfaces of said hook body to process limit slip, and enter and leave a groove formed by said two shield plates.

17. The safety hook according to claim 1, wherein said another side of said hook body is configured with a second space above said first space, and said hook body is configured with a second hole at a junction of said first space and said second space; said control handle has an end plate stretched across an opening of said first space and said second space and said two shrouds symmetrically covering two ends of said second hole, a middle position of each said shroud is configured with a fourth hole matching with said second hole, thereby allowing said second shaft to be passed through said second hole and said fourth holes.

18. The safety hook according to claim 17, wherein said second shaft is put into said second spring between said two shrouds, one end of said second spring is abutted against said hook body, another end thereof pushes said end plate of said control handle and limits said control handle only to swing with respect to said second shaft toward said second space, thereby unlocking said valve.

* * * * *